Dec. 22, 1959  R. E. UHLENHAUT ET AL  2,918,148
HYDRAULIC BRAKE SYSTEM FOR MOTOR VEHICLES
Filed Nov. 27, 1956
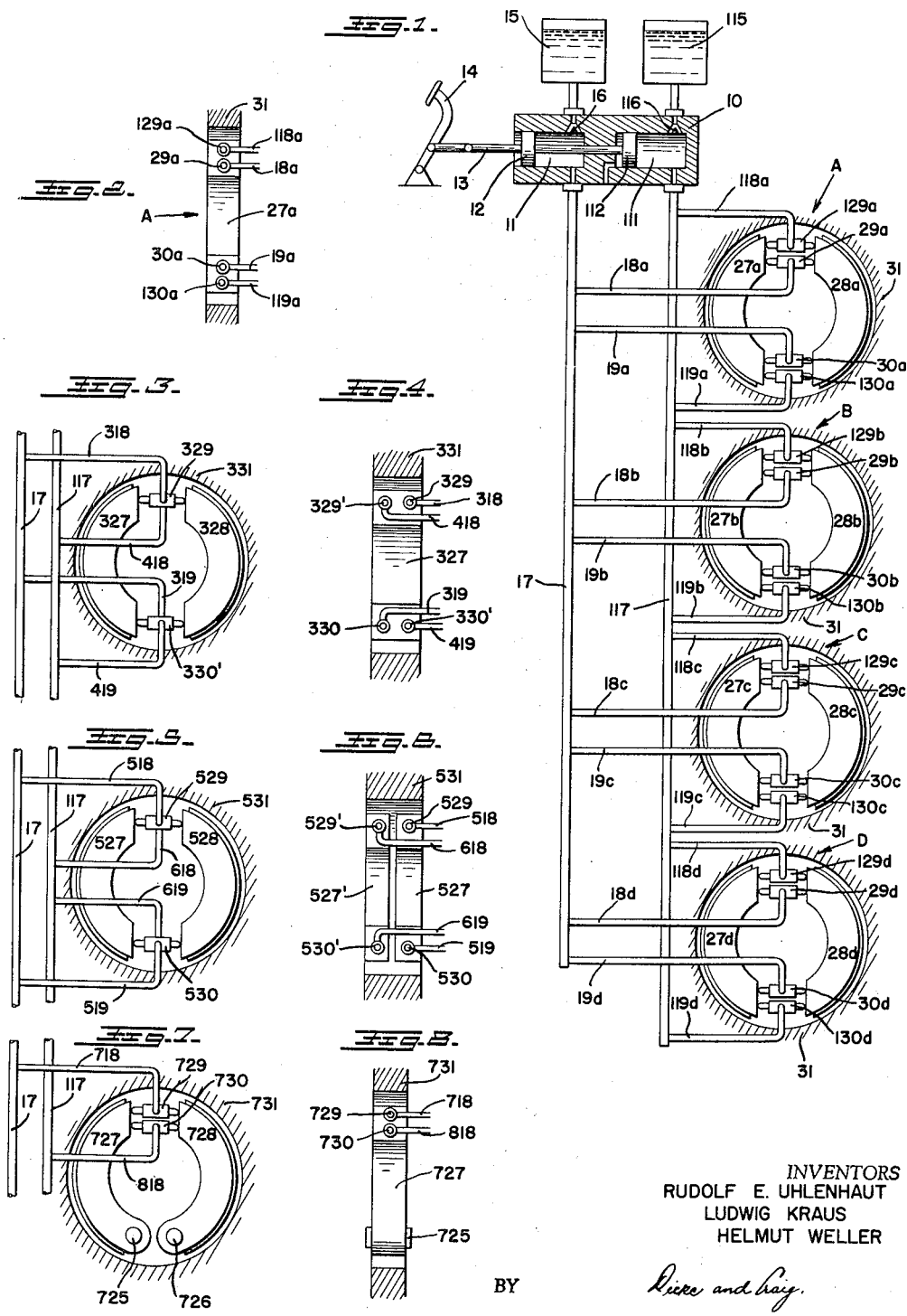
INVENTORS
RUDOLF E. UHLENHAUT
LUDWIG KRAUS
HELMUT WELLER
BY
ATTORNEYS.

United States Patent Office 2,918,148
Patented Dec. 22, 1959

2,918,148
HYDRAULIC BRAKE SYSTEM FOR MOTOR VEHICLES

Rudolf E. Uhlenhaut, Stuttgart, Ludwig Kraus, Stuttgart-Rotenberg, and Helmut Weller, Stuttgart, Germany, assignors to Daimler-Benz Aktiengesellschaft, Stuttgart-Unterturkheim, Germany Application November 27, 1956, Serial No. 624,661
Claims priority, application Germany November 30, 1955
1 Claim. (Cl. 188—152)

The present invention relates to hydraulic brake system for motor vehicles, and more particularly to a hydraulic brake system in which a dual or twin hydraulic brake system is used in connection with the brakes of each wheel to assure proper operation thereof in case of leakage or failure of one of the two hydraulic systems.

The usual hydraulic brake systems in which upon actuation of the brake pedal a piston is moved in unison therewith to produce an oil pressure in a master cylinder which oil pressure is conducted or supplied to the individual brake cylinders actuating the brake shoes have the disadvantage that upon leakage in the lines at any place in the system all of the brakes immediately fail to operate which in particular with motor vehicles may lead to dangerous accidents.

The present invention avoids this disadvantage.

In particular, the present invention proposes a hydraulic brake installation with two separate hydraulic systems which is characterized by the fact that both hydraulic brake systems are coordinated to each wheel brake, i.e., each wheel brake is normally actuated simultaneously by both hydraulic brake systems. In that manner a very great safety of operation is assured. If one of the two systems should become inoperative due to leaks of one of the lines, then upon actuation of the brake pedal nonetheless all of the wheel brakes will operate since the wheel brakes will be continued to be actuated over the second hydraulic system.

In connection therewith, the overall installation is particularly safe if both hydraulic systems are coordinated to each individual brake shoe of every wheel brake, i.e., if each individual brake shoe is simultaneously actuated by both hydraulic systems. In that case, during failure of one of the brake systems, not only every brake but also every individual brake shoe will continue to be actuated.

In modern brake installations with two internal, expanding brake shoes for each brake drum which are displaceable essentially rectilinearly, care must be taken that upon failure of one of the two hydraulic systems in accordance with the present invention the actuating pressure is transmitted also to the brake shoes in such a manner that no wedging or jamming can take place due to canting or edging of the individual shoe, as a result of asymmetrically applied forces.

In particular, the present invention proposes in connection therewith that two wheel brake cylinders with corresponding pressure bolts be arranged radially behind each other between the opposite end faces of the brake shoes of which the two inner cylinders are coordinated to or connected with one and the two outer cylinders with the other hydraulic system.

However, it is also possible to provide the hydraulic brake system in such a manner that each of the brake cylinders is arranged adjacent one another at the same radial distance from the brake drum axis whereby the forwardly disposed cylinder of one pair of cylinders located between opposed end faces of the brake shoes and the rearwardly disposed cylinder of the other pair of cylinders located between diametrically opposite end faces of the brake shoes are coordinated to the one hydraulic system while the rearwardly disposed brake cylinder of the first-mentioned pair and the forwardly disposed cylinder of the second-mentioned pair are coordinated to the other hydraulic system. Such a system provides actuation of each brake shoe by means of a forwardly and a rearwardly disposed bolt member belonging to the same hydraulic brake system.

It is understood, of course, that the present invention is also applicable to the usual pivotal brake shoes of the internal expansion type. In such a system two brake cylinders are arranged radially behind each other, for example, between the opposite end faces of the brake shoes or also adjacent one another at the same radial distance from the brake drum axis whereby each cylinder is then actuated by one of the two hydraulic systems.

A further development of the present inventive concept proposes that two brake shoes or pairs of brake shoes be coordinated to the brake member rotating with the wheel, preferably a brake drum, of which both or each brake cylinder is actuated by one of the hydraulic systems.

Accordingly, it is an object of the present invention to provide a hydraulic brake system for motor vehicles which assures greater safety in the operation of vehicles, particularly greater reliability of the brake system.

Another object of the present invention is to provide a brake hydraulic system which avoids accidents due to possible leakages or defects in the brake lines or system of the hydraulic brake arrangement of motor vehicles.

A still further object of the present invention is the provision of a brake system for motor vehicles having a twin hydraulic brake system which is so arranged as to provide proper actuation of the brake shoes even in case of failure of one of the systems without danger of wedging or jamming the shoes.

These and other objects, features and advantages of the present invention will become more obvious from the following description when taken in connection with the accompanying drawing which shows, for the purposes of illustration only, several preferred embodiments in accordance with the present invention and wherein:

Figure 1 is a schematic showing of a twin hydraulic brake system for motor vehicles in accordance with the present invention, in which the four wheels are shown more or less schematically in front view.

Figure 2 is a more or less schematic side view through the arrangement of the brake for one of the wheels of Figure 1.

Figures 3 and 4 are more or less schematic front and side views, respectively, of a wheel with a modified brake cylinder arrangement in accordance with the present invention.

Figure 5 and 6 are more or less schematic front and side views, respectively, of a wheel with still another modification of a brake cylinder arrangement in accordance with the present invention, and Figures 7 and 8 are more or less schematic front and side views respectively of a wheel with a still further modified embodiment of a brake cylinder and brake shoe arrangement in accordance with the present invention.

Referring now more particularly to the drawing wherein like reference numerals are used throughout the various views to designate like parts, and more particularly to Figures 1 and 2, reference numeral 10 designates the master cylinder of the brake system which is formed as a tandem or twin-cylinder provided with two pressure spaces 11 and 111. Corresponding pressure pistons 12 and 112 slide within the cylinder spaces 11 and 111, the pistons 12 and 112 being secured to a common piston rod 13 which is actuated by the brake pedal 14. The pressure spaces 11 and 111 are supplied with braking fluid from the two brake fluid reservoirs 15 and 115, respectively, over check valves 16 and 116 of conventional construction and indicated in the drawing only schematically.

The pressure space 11 is in communication with the distributing line 17 and the pressure space 111 with the distributing line 117.

The four-wheel brakes are generally designated by reference characters A, B, C and D respectively. The pressure fluid reaches the brake A from the distributing line 17 over lines 18a and 19a, the brake B over the lines 18b and 19b, the brake C over the lines 18c and 19c, and the brake D over the lines 18d and 19d.

In a corresponding manner, the lines 118a and 119a lead from the distributing line 117 to the brake A, the lines 118b and 119b from the distributing line 117 to the brake B, the lines 118c and 119c from the distributing line 117 to the brake C and the lines 118d and 119d from the distributing line 117 to the brake D.

The brake shoes 27a and 28a, 27b and 28b, 27c and 28c, and 27d and 28d of the brakes A, B, C and D, respectively are displaceable outwardly in parallel as is well known with such types of internal expansion brakes.

A pair of brake cylinders 29a and 129a which are disposed radially behind each other and a pair of brake cylinders 30a and 130a which are also disposed radially behind each other actuate the two pairs of opposed end faces of the brake shoes 27a and 28a respectively with the aid of pressure bolts which protrude toward both sides from each of the brake cylinders 29a, 129a, 30a and 130a so that upon supply of oil under pressure to the brake cylinders 129a, 29a, 30a and 130a over lines 17 and 117, etc., the brake shoes 27a and 28a are forced rectilinearly outwardly, i.e., are expanded against the brake drum, indicated schematically in the drawing and designated therein by reference numeral 31 so as to provide the desired braking action.

The actuation and operation of each of the other brakes B, C and D of the other three wheels takes place in a similar manner and by means of elements which are designated, therefore, by corresponding reference numerals with appropriate suffixes, a detailed description of which is believed unnecessary herein.

Figures 3 and 4 illustrate an embodiment which is constructed in principle similar to the brake construction of Figures 1 and 2 with the exception that the brake cylinders 329 and 329' and the brake cylinders 330 and 330' are disposed at the same radial distance from the axis of the brake drum 331 adjacent one another. As clearly indicated in Figure 4, the brake cylinders are interconnected in the hydraulic systems in a crosswise manner, i.e., each brake shoe is actuated by the bolt members of two crosswise disposed brake cylinders connected to the same hydraulic brake system to the fact that the brake cylinders 329 and 330 which are disposed outwardly and inwardly respectively relative to the other cylinders, are connected with the distributing line 17 over lines 318 and 319 while the brake cylinders 329' and 330' are connected with the distributing line 117 over lines 418 and 419. As a result of this construction, upon failure of one of the brake systems a relatively even pressure distribution on the brake linings or on the brake drum 331 is assured.

The modification according to Figures 5 and 6 is provided with two separate pairs of brake shoes 527 and 528 and 527' and 528' respectively, as shown in particular in Figure 6. One pair of brake shoes 527 and 528 and one pair of brake shoes 527' and 528' is coordinated to each hydraulic system by the connection of brake cylinders 529 and 530 with the distributing line 17 over lines 518 and 519 while the brake cylinders 529' and 530' are connected with the distributing line 117 over lines 618 and 619.

The modification according to Figures 7 and 8 illustrates a brake system in which the brake shoes 727 and 728 are pivotally supported on pins 725 and 726 respectively. Consequently, upon actuation of the brake pedal 14, the brake shoes 727 and 728 are not moved outwardly in parallel but instead are actuated by pivotal movement about the pins 725 and 726. The shoes 727 and 728 are actuated simultaneously by the bolt members of brake cylinders 729 and 730 whereby the brake cylinder 727 is connected with the distributing line 17 over line 718 and the brake cylinder 730 with the distributing line 117 over line 818.

As becomes quite obvious from the drawing and the description hereinabove, during failure of one of the brake systems including the distributing line 17 or 117 the brake shoes of the particular wheel brake are nevertheless brought into braking abutment against the respective brake drums due to the continued actuation thereof by the other brake system so that all of the wheels are braked evenly at all times, and any unilateral braking of the vehicle and therewith the danger of skidding is avoided.

In the drawing the brakes of all four wheels have been shown similar. However, this is not necessarily the case insofar as the present invention is concerned. For example, the pair of front wheels may have a brake arrangement different from that of the pair of rear wheels, one pair being constructed in accordance with one of the embodiments illustrated herein while the other pair is constructed in accordance with a different embodiment.

Moreover, the present invention is not limited to vehicles having four wheels but may be used with a vehicle having any number of wheels.

While we have shown and described several preferred embodiments in accordance with the present invention, it is understood that the same is not limited thereto, but is susceptible of many changes and modifications within the spirit of the present invention, and we intend to cover all such changes and modifications, except as defined by the appended claim.

We claim:

A hydraulic brake system for vehicles, particularly motor vehicles having a plurality of wheels, comprising brake means for each wheel including a brake drum and one pair of displaceable expansion-type brake shoes only per brake drum, each brake shoe being provided with one actuating surface at each end thereof mutually opposite a respective actuating surface of the complementary brake shoe of the particular pair, two pairs of brake cylinders per wheel, each pair being disposed between two mutually opposite actuating surfaces of the respective pair of brake shoes, two separate hydraulic brake systems, one brake cylinder of each pair of brake cylinders being connected with one of said systems, the other one brake cylinder of each pair being connected to the other system, and actuating means for simultaneously actuating both of said hydraulic systems, the brake cylinders of each pair being disposed adjacent one another essentially at the same radial distance from the axis of the brake drum, the outwardly disposed brake cylinder of one pair and the inwardly disposed cylinder of the other pair of each wheel being operatively connected with one of said systems and the inwardly disposed cylinder of said first-mentioned pair and the outwardly disposed cylinder of said second-mentioned pair being operatively connected with the other system.

References Cited in the file of this patent

UNITED STATES PATENTS

| | | |
|---|---|---|
| 1,630,178 | Harrington | May 24, 1927 |
| 2,008,975 | Boughton et al. | July 23, 1935 |
| 2,174,615 | Bowen et al. | Oct. 3, 1939 |
| 2,209,343 | Masteller | July 30, 1940 |
| 2,324,007 | MacPherson | July 13, 1943 |